INVENTOR
THEODOR PLOETZ
by Walter S. Pleston
ATTORNEY

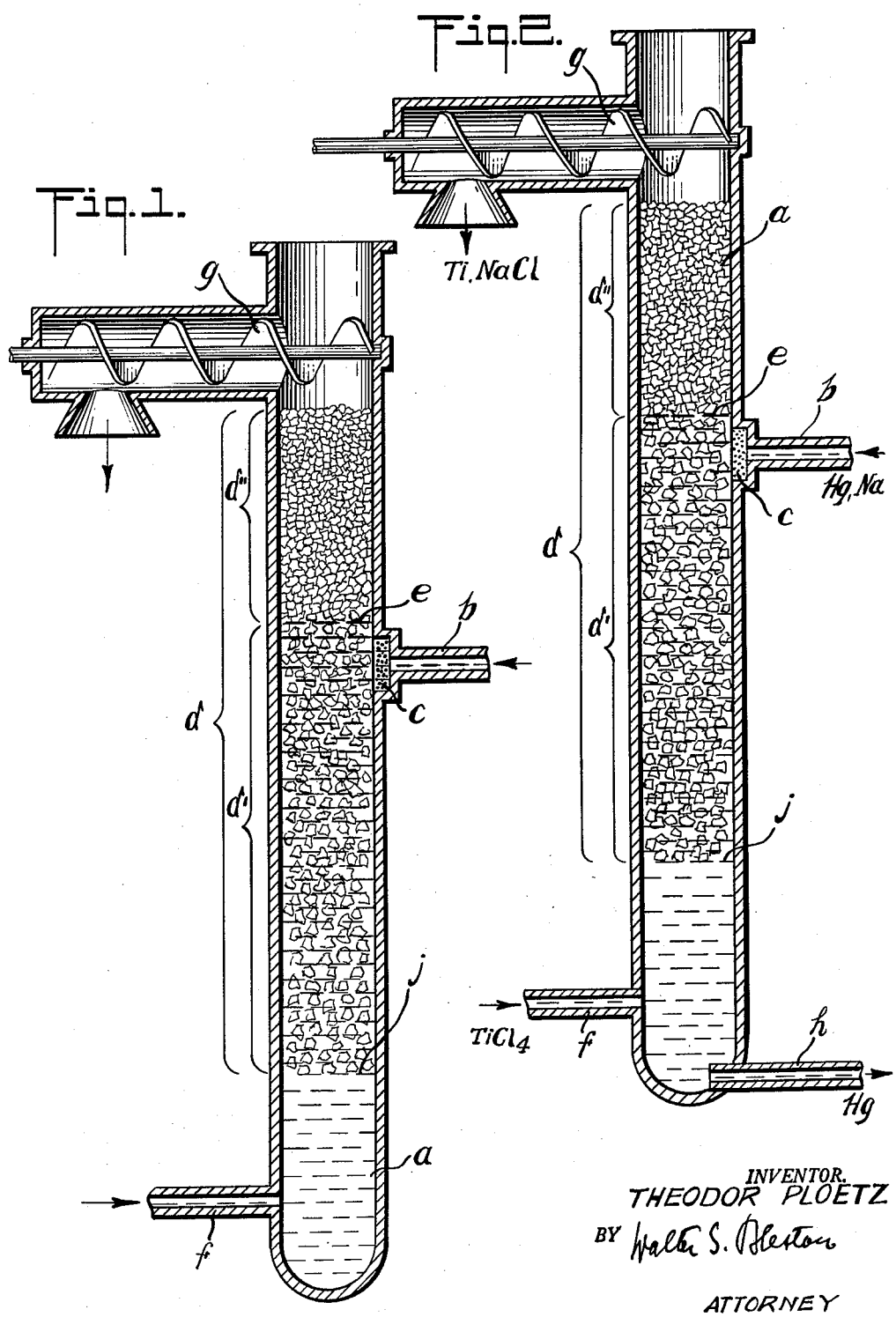

United States Patent Office 2,915,385
Patented Dec. 1, 1959

2,915,385

PROCESS OF CARRYING OUT CHEMICAL REACTIONS

Theodor Ploetz, Hösel, Dusseldorf-Mettmann, Germany, assignor to Feldmühle Papier- und Zellstoffwerke, A.G., Dusseldorf-Oberkassel, Germany Application March 6, 1957, Serial No. 644,322

Claims priority, application Germany March 10, 1956

2 Claims. (Cl. 75—84.5)

The present invention relates to a process of carrying out chemical reactions and more particularly to a process of carrying out chemical reactions whereby a relatively heavy liquid is used as one of the reaction components or media.

When reacting a relatively heavy liquid reactant with a reactant of a lower specific gravity whereby a reaction product, also of lower specific gravity, is formed, the difficulty arises that the time of contact of the two starting materials cannot be sufficiently extended, without further provisions and measures, to achieve complete reaction. The reactant of lower specific gravity and the resulting reaction product ascend in the reaction mixture, i.e. in the heavy liquid with varying velocity and form a layer on top of said heavy liquid which layer readily separates therefrom. As a result thereof the desired reaction does not proceed in said layer with satisfactory speed and completeness.

Such a reaction is, for instance, the formation of a metal and of sodium chloride by introducing a metal chloride into liquid sodium amalgam. The difficulties which arise on carrying out such a reaction, are clearly evident. The high specific gravity of liquid sodium amalgam causes not only the other reactant, the metal chloride, but also the solid reaction products produced thereby, the metal and sodium chloride, to ascend in the amalgam with considerable speed and to form a layer swimming on top thereof. Consequently only a minor fraction of the reactants is actually reacted.

A number of measures and means of solving the problem to increase the reactivity in such an instance have been used heretofore. It has been suggested, for instance, to provide special stirring devices by means of which the ascending reactants and reaction products are forced below the surface of the heavy liquid. Satisfactory results can be achieved by means of such stirring devices only when stirring the reaction mixture for a disproportionately prolonged period of time and with a considerable expenditure of power because the particles of lower specific gravity tend to ascend very rapidly each time they have been submerged. Due to such rapid ascending the contemplated reaction takes place to a very slight extent only.

Another known method of accelerating the reaction of a heavy liquid reactant with a lighter reactant consists in filling the reaction chamber with packing materials. Such packing materials decrease the velocity with which the reactant of lower specific gravity ascends throughout the heavy liquid reactant and, thereby, prolong the reaction time. When using such packing materials, no additional power for stirring is required. However, the layer of packing material must be freed of adhering particles of the reaction product at regular intervals. Such cleaning of the packing material is rather time consuming.

It is one object of the present invention to provide a simple and effective process of reacting a heavy liquid reactant with a reactant of lower specific gravity whereby the heretofore encountered difficulties are overcome.

Another object of the present invention consists in providing a highly effective continuous process of reacting a heavy liquid reactant with a reactant of lower specific gravity whereby complete reaction is achieved in the shortest possible period of time.

Still another object of the present invention is to provide a simple and effective apparatus for carrying out reactions between a heavy liquid reactant and a reactant of lower specific gravity.

Other objects of the present invention and advantageous features thereof will become apparent as the description proceeds.

In principle, the process according to the present invention consists in utilizing the reaction products proper as means which decrease the velocity with which the reactant of lower specific gravity ascends within the heavy liquid reactant. An essential prerequisite of such a process is that the resulting reaction product be a solid granular material of a lower specific gravity than that of the heavy liquid reactant. Furthermore, in order to order to prevent such solid granular reaction products from ascending within the heavy liquid reactant, a solid layer of said reaction product is arranged on top of the heavy liquid, the weight of which prevents the reaction product within the liquid from rapidly ascending therein.

The process according to the present invention is especially suitable for carrying out reactions in continuous operation since, thereby, the upward thrust or buoyancy of the solid granular reaction product which is continuously formed within the heavy liquid reactant, can be utilized to raise the uppermost layer of the reaction product beyond the liquid level so that it can be withdrawn or discharged from the reaction chamber.

The present invention will be described in detail in connection with the accompanying drawings.

Fig. 1 of said drawings illustrates a side-sectional view of an apparatus having a lower and an upper inlet for the reactants and a discharge opening at the top of the apparatus.

Fig. 2 illustrates a side-sectional view of a similar apparatus wherein an outlet pipe for one of the reaction products is provided at the bottom of the apparatus.

In said figures like reference characters indicate like parts thereof.

Figure 3:
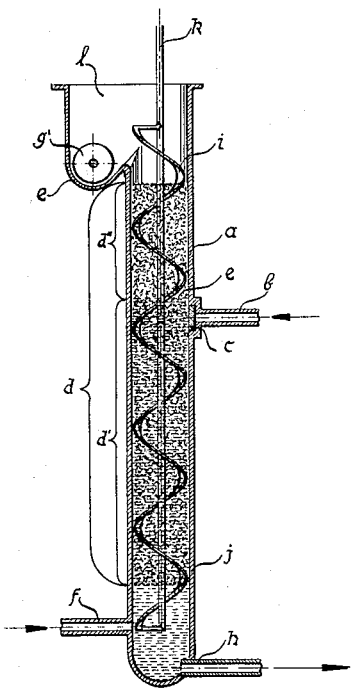
Fig. 3 illustrates a side-sectional view of an apparatus similar to the apparatus shown in Fig. 2 but provided with a scraping device preventing adherence of the reaction products to the walls of the apparatus.

Reaction chamber $a$ has a relatively small cross-section and is relatively high. Through inlet pipe $b$ reaction chamber $a$ is first filled partly with the heavy liquid reactant. Porous plate or sieve $c$ is provided at the place where pipe $b$ enters the reaction chamber $a$. Said porous plate or sieve serves to prevent the solid granular reaction product from entering inlet pipe $b$. The solid granular reaction product, i.e. the granular product obtained from a preceding charge, is introduced into reaction chamber $a$ and forms therein layer $d$. The level of the heavy liquid reactant increases thereby to predetermined level $e$ and separates layer $d$ into two sections, namely into the lower layer $d'$ within the heavy liquid reactant and upper layer $d''$ above liquid level $e$. Said layer $d''$ produces the state of equilibrium with respect to the buoyancy of layer $d'$ submerged in the heavy liquid reactant.

On introducing the other reactant or a plurality of reactants, which might be solid, liquid or gaseous, into the heavy liquid through inlet pipe $f$ provided near the bottom of reaction chamber $a$, such other reactant ascends within the heavy liquid up to layer $d'$ where its upwardly directed velocity is decelerated to such an extent that it is exposed to the action of the heavy liquid reactant for a sufficiently prolonged period of time to substantially complete reaction. Thereby, the reactants are converted into the solid granular reaction product which forms submerged layer $d'$ and/or increases the volume of the individual particles of the granular reaction product which are already present in the heavy liquid reactant. Said solid granular reaction product forms the packing material. Thereby, the buoyancy in layer $d'$ is increased. As a result thereof, a certain number of particles of the solid granular reaction product leaves layer $d'$ and enters layer $d''$ through liquid level $e$, thus, restoring the initially existing state of equilibrium. When withdrawing excess solid granular reaction products from layer $d''$ by means of withdrawing device $g$ which is shown in Figs. 1 and 2 as an endless screw conveyer, lower or bottom level $j$ of layer $d'$ is always kept at the same height. The heavy liquid reactant consumed during reaction can be replaced by the introduction of additional amounts thereof through inlet pipe $b$. Thus, the reaction is carried out continuously whereby the liquid level $e$ can always be maintained at the desired height.

The process according to the present invention can, of course, also be used when the heavy liquid reactant is not completely converted into the reaction product when, for instance, only part thereof is reacted. An apparatus which is especially suitable for carrying out such a reaction is illustrated, for instance, in Fig. 2. This apparatus differs from that of Fig. 1 merely by the provision of a second pipe $h$ at the bottom of reaction chamber $a$. Such a reaction whereby only part of the heavy liquid reactant is consumed is, for instance, the reaction of sodium amalgam with titanium tetrachloride whereby titanium metal and sodium chloride are formed as solid granular reaction products while liquid mercury is collected at the bottom of the reaction chamber. As illustrated in Fig. 2, liquid sodium amalgam obtained, for instance, by alkali chloride electrolysis by means of mercury cathodes, is introduced through inlet pipe $b$ into reaction chamber $a$. In said chamber, the amalgam is reacted with liquid titanium tetrachloride introduced through inlet pipe $f$ and ascending in said liquid amalgam. The titanium tetrachloride reacts with the sodium metal component of the amalgam and forms titanium metal and sodium chloride. Both reaction products precipitate in granular form from the liquid amalgam. Due to their low specific gravity with respect to the high specific gravity of sodium amalgam and of mercury, they ascend within the reaction chamber and form layer $d'$ within the liquid reaction mixture. The reaction proceeds step-by-step because first titanium subchlorides are formed from the liquid titanium tetrachloride. Such subchlorides are also solid products at the temperatures required in the reaction chamber. The rise of said solid subchlorides in packing layer $d'$ is considerably retarded so that reaction thereof with the sodium amalgam and conversion into titanium metal is completed before said particles reach the liquid level $e$. On the other hand, the amalgam, on passing through layer $d'$ of titanium subchloride, titanium metal, and sodium chloride in downward direction loses most of its sodium metal content so that it can be withdrawn at the bottom of the reaction chamber through discharge pipe $h$ in the form of mercury or of an amalgam poor in sodium metal. Such an amalgam can readily be used as cathode liquid in mercury cells and does not require any further preparation and purification.

It is, of course, also possible to operate an apparatus according to Fig. 2 concurrently. For this purpose, for instance, highly concentrated sodium amalgam is introduced through pipe $h$ into reaction chamber $a$. Reaction with titanium tetrachloride introduced through pipe $f$ near the bottom of the apparatus proceeds much more violently than when working countercurrently as described hereinabove and the formed mercury or spent amalgam of low sodium metal content is withdrawn through pipe $b$ which is arranged slightly below mercury level $e$.

In both described instances the process according to the present invention is distinguished over the prior art processes by its remarkable simplicity and reliability. The process is especially advantageous inasmuch as the reaction product which is withdrawn from the top of column $d''$ contains only small amounts of heavy liquid reactant because separation of the liquid by draining on ascending within layer $d''$ is effected rather completely due to the high specific gravity of the liquid reactant.

Fig. 3 illustrates an apparatus which is especially suitable for reactions whereby reaction products are formed or reactants are used which tend to adhere to the walls of the reaction chamber. In such instances a metal spiral $i$ is provided within the reaction chamber. Said spiral $i$ is driven by shaft $k$ by means of a motor (not shown in the drawing). Metal spiral $i$ is dimensioned in such a manner that it contacts the walls of reaction chamber $a$ and, on rotation around its axis by means of shaft $k$, scrapes off any particles of reactants and/or reaction products adhering to the walls of chamber $a$. This metal spiral $i$ has the further advantage that it prevents baking together of the reaction product in the upper part of layer $d''$. Screw conveyer $g'$ is preferably arranged in a manner different from the arrangement shown in Figs. 1 and 2. It is provided at a laterally arranged trough $l$. Since, as pointed out hereinabove, baking together of the reaction product is prevented by metal spiral $i$, the upper layer thereof drops by itself, in accordance with its angle of repose, into laterally attached trough $l$ and is removed therefrom by means of screw conveyer $g'$.

It is, of course, understood that, in place of metal spiral $i$, other devices may be provided which either prevent adhering of the reactants and/or reaction products to the walls of the reaction chamber or which remove adhering particles therefrom, for instance, by scraping. Such other means are, for instance, reciprocating scrapers, doctor blades, and others.

As reaction components, there are used liquid reactants of high specific gravity and solid, liquid or gaseous reactants of lower specific gravity. The present invention has proved to be especially suitable for carrying out the chemical reaction between an alkali metal amalgam such as sodium amalgam or potassium amalgam, and a metal chloride of the metals titanium, zirconium, or hafnium which metal chlorides are used in the form of their tetrachlorides, trichlorides, and dichlorides.

The following examples serve to illustrate the present invention without, however, limiting the same thereto.

*Example 1*

0.2% sodium amalgam produced by sodium chloride electrolysis on mercury cathodes is continuously pumped through inlet pipe $b$ into an apparatus similar to that as illustrated in Fig. 3 which consists of a cylindrical tube of a height of 300 cm. and an inner diameter of 9 cm. The reaction chamber and the pipes are made of stainless steel which also applies to filter $c$ which consists of a fine-mesh screen of the same material. The liquid sodium amalgam fills the reaction chamber $a$ to about two-thirds of its height. At the beginning of the experiment a mixture of pulverulent titanium and sodium chloride obtained in a preceding experiment is poured on the liquid sodium amalgam until the upper surface of this mixture reaches approximately to the level of screw conveyer $g'$. Said mixture consists not only of titanium and sodium chloride, but also of mercury which still adheres to the pulverulent mixture. One filling of the apparatus requires an amount of approximately 40 kg.

consisting of 2 kg. of pulverulent titanium, 10 kg. of pulverulent sodium chloride, and approximately 28 kg. of mercury. After the mixture has been poured into the apparatus, it fills approximately 150 cm. of its length. The greater part of the mixture is submerged below the liquid level of the sodium amalgam which was first introduced, while the remainder stays above the sodium amalgam. Since the pulverulent mixture when poured into the apparatus already contains liquid mercury, the exact location of the cohesive liquid level $e$ is not precisely defined. The contents of the reaction chamber $a$ are heated to a temperature of 200 to 250° C. by means of a suitable heating system, not shown in the drawings, which surrounds the wall of the reaction chamber, and they are maintained at such temperature during the entire length of the process. Liquid titanium tetrachloride is then pumped through pipe $f$ into the apparatus and evaporates therein as soon as it comes into contact with the hot sodium amalgam, and ascends through the contents of the reaction chamber $a$ in the form of vapor bubbles. During its ascent, the titanium tetrachloride is first converted into titanium trichloride, that is, into a solid in the form of small individual granules contained within the mixture of metal and salts swimming within the liquid sodium amalgam. During their continued ascent, these small granules are then further converted into titanium dichloride and finally into pulverulent titanium metal. Such conversion at the same time also results in the formation of sodium chloride, likewise in a fine-granular form. The resulting mixture of titanium metal and sodium chloride, due to their lower specific gravity, slowly and gradually migrates and ascends in the reaction chamber, so that parts of the granular mixture successively rise from the submerged layer $d'$ into layer $d''$ and are finally withdrawn from the reaction chamber $a$ by means of screw conveyer $g'$. The conversion also results at the same time in a separation of the greater part of the sodium amalgam into liquid mercury which collects at the bottom of the reaction chamber $a$ and is discharged through pipe $h$ while at the same time a fresh supply of sodium amalgam is continuously added through pipe $b$. The mercury discharged through pipe $h$ contains no more than about 0.02% of sodium metal and is then returned to the electrolytic cells as cathode liquid.

The amount per hour which is passed into the apparatus is 950 g. of titanium tetrachloride and 255 kg. of 0.2% sodium amalgam, while the yield per hour is 240 g. of pulverulent titanium,
1170 g. of sodium chloride, and
254.54 kg. of 0.02% sodium amalgam.

*Example 2*

The procedure is substantially the same as described in Example 1. However, in place of 0.2% sodium amalgam, there is employed the equimolecular amount of 0.3% potassium amalgam and, in place of titanium tetrachloride, the equimolecular amount of zirconium tetrachloride. Furthermore, this procedure differs from that described in Example 1 insofar as it concerns a reaction between a liquid and a solid since, under the reaction conditions, the zirconium tetrachloride is a solid. The zirconium tetrachloride is introduced by first forming a dispersion in mercury and then feeding it under pressure through pipe $f$ into the apparatus in which the conversion will then take place similarly as described in Example 1.

The amount per hour which is passed into the apparatus is 278.055 kg. of 0.3% potassium amalgam, and
1.165 kg. of zirconium tetrachloride, while the yield per hour is 0.455 kg. of pulverulent zirconium,
1.490 kg. of potassium chloride, and
277.275 kg. of 0.02% potassium amalgam.

*Example 3*

Similarly as in Example 1, titanium tetrachloride is in this example converted by means of a reduction metal into metallic titanium and a chloride of the reduction metal. In this case, the reduction metal is magnesium which is introduced into the reaction chamber dissolved in molten cadmium. The dimensions and the material of the reaction chamber are the same as described in Example 1. The reaction chamber is first filled with 100 kg. of a molten metallic mixture of a temperature of 350° to 400° C. which, aside from the molten cadmium, contains 2.325 kg. of magnesium. This temperature will be maintained during the entire process. Thereafter, approximately 47.3 kg. of a pulverulent mixture of titanium and magnesium chloride containing 9.6 kg. of titanium and 37.7 kg. of magnesium chloride are poured from above into the reaction chamber. Similarly as in Example 1, liquid titanium chloride is pumped into the apparatus through pipe $f$, and it evaporates therein as soon as it comes into contact with the metal alloy and it gradually reacts with the magnesium of the alloy in the manner as previously described. The resulting material ascends in the form of a granular mixture from layer $d'$ into and through layer $d''$, and is then removed from the reaction chamber $a$ by means of screw conveyor $g'$.

The amount per hour which is passed into the apparatus is 3.8 kg. of titanium tetrachloride, as well as 40 kg. of the alloy which contains 0.93 kg. of magnesium.

The yield per hour is 0.96 kg. of pulverulent titanium, and
3.77 kg. of magnesium chloride, while about 39 kg. of molten cadmium which is almost free of magnesium is discharged at the lower end of the apparatus. This molten cadmium is again enriched to its original percentage of magnesium and then again introduced into the reaction chamber. This enrichment of the cadmium with magnesium may also be carried out in an electrolytic cell in which magnesium chloride is decomposed by means of a liquid cadmium cathode so that the cathodic product of the electrolysis will be a mixture of molten cadmium and magnesium.

*Example 4*

The apparatus used in this example is one similar to that as described in Example 1. It is supplied with 0.4% sodium amalgam, its upper part is filled with pulverulent sodium cyanate, and molten urea is pumped through pipe $f$ into the reaction chamber. The amalgam is maintained at a temperature of 180° to 200° C. The conversion of the urea in the heated amalgam, during which hydrogen and ammonia are split off, proceeds according to the equation:

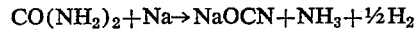

$$CO(NH_2)_2 + Na \rightarrow NaOCN + NH_3 + \tfrac{1}{2}H_2$$

The intermediate product is assumed to be sodium ureate which will be completely converted into cyanate by the prolonged reaction time resulting from the submersion of the cyanate in the amalgam. The amalgam will be converted practically entirely into metallic mercury. At the upper end of the reaction chamber, the gases formed during the reaction are drawn off, as well as the ascending mixture of sodium cyanate together with the mercury adhering thereto from which the cyanate is then isolated in a pure form by known methods, for example, by solution in water and precipitation with alcohol. If 600 g. of urea are introduced per hour into the apparatus, approximately 630 g. of sodium cyanate will be attained during such time at a degree of purity of 96 to 98%. If the sodium is to be consumed as completely as possible, it is necessary after the second hour of operation to supply 60 kg. of amalgam per hour to the apparatus.

*Example 5*

In place of a metallic liquid as in the previous examples, a heavy organic liquid, that is, hexachloro-cyclopentadiene, is in this example filled into the same apparatus until it reaches ⅔ of the height of the reaction chamber. At the beginning of the process, pulverulent ammonium chloride is poured into the apparatus until its upper surface reaches approximately to the level of screw conveyer $g'$. Thereafter, gaseous ammonia is continuously passed into one of the two pipes $f$ and $h$ near the lower end of the apparatus and allylchloride continuously into the other. The reaction then occurs at about 100° C. in that part of the reaction chamber which is filled with the hexachloro-cyclopentadiene, and such reaction results in the formation of allylamine and ammonium chloride in accordance with the following formula:

$$CH_2:CH \cdot CH_2Cl + 2NH_3 \rightarrow CH_2:CH \cdot CH_2 \cdot NH_2 + NH_4Cl$$

The allylamine is gaseous and continuously passed off the upper part of the apparatus, through a pipe passing through a cover which in this case closes the upper end, while the ammonium chloride formed in the reaction constitutes the solid pulverulent material which prolongs the reaction time. The excess of this material formed in the course of the process in the reaction chamber ascends therein toward screw conveyer $g'$ and is removed thereby from the reaction chamber.

The amount per hour which is passed into the apparatus is 0.383 kg. of allylchloride, and
0.35 kg. of gaseous ammonia, while the yield per hour is 0.268 kg. of pulverulent ammonium chloride, and
0.285 kg. of allylamine.

Although my invention has been illustrated and described with reference to the preferred embodiments thereof, I wish to have it understood that it is in no way limited to the details of such embodiments or to the specific examples described, but is capable of numerous modifications within the scope of the appended claims. Thus, for example, instead of heating the reaction chamber by surrounding heating elements, it is also possible to heat the respective materials prior to their insertion and to insert them into the reaction chamber at the proper required temperature.

Having thus fully described my invention, what I claim is:

1. In a process of continuously producing a metal selected from the group consisting of titanium, zirconium, and hafnium in pulverulent form by reacting a liquid alkali metal amalgam with a metal chloride selected from the group consisting of the tetrachlorides, trichlorides, and dichlorides of titanium, zirconium, and hafnium, the steps which comprise providing in a vertical reaction chamber three separate zones, the first lower zone constituted by liquid alkali amalgam, the second intermediate zone constituted by a fluid mixture of liquid alkali amalgam, a granular alkali metal chloride, and a granular metal selected from the group consisting of titanium, zirconium, and hafnium, said alkali metal chloride and metal being formed on reaction of said alkali metal amalgam and said metal chloride, said intermediate zone being of a height and density sufficient to cause substantially complete reaction between the alkali metal amalgam and the metal chloride, said alkali metal chloride and said metal constituting a substantially quiescent layer serving as filler material, and the third upper zone constituted of said alkali metal chloride and said metal, said upper zone being of sufficient height to hold in place the quiescent layer of alkali metal chloride and metal in said second intermediate zone and to form a separation layer for separating said metal from mercury, heating said vertical reaction chamber to a temperature between about 200° C. and about 250° C., continuously introducing a metal chloride selected from the group consisting of the tetrachlorides, trichlorides, and dichlorides of titanium, zirconium, and hafnium into said first lower zone and a liquid alkali metal amalgam at the top of said second intermediate zone into said reaction chamber, thereby causing the metal chloride to ascend within said first and second zones, the quiescent layer of alkali metal chloride and metal reducing the velocity of ascent of said metal chloride in said second zone to cause substantially complete conversion of the metal chloride into granular metal, continuously withdrawing, in a substantially amalgam- and mercury-free state, the granular mixture of metal and alkali metal chloride from the top of said third upper zone at the rate of introduction of alkali metal amalgam and metal chloride into the reaction chamber, and continuously discharging the mercury formed during said reaction from said first lower zone.

2. The process according to claim 1, wherein means are provided in the reaction chamber to prevent adhering of the solid reaction products to the walls of the reaction chamber.

References Cited in the file of this patent

UNITED STATES PATENTS

| | | |
|---|---|---|
| 2,618,550 | Hampel et al. | Nov. 18, 1952 |
| 2,758,921 | Schmidt | Aug. 14, 1956 |
| 2,813,787 | Schmidt | Nov. 19, 1957 |